United States Patent [19]
Holzer et al.

[11] 3,772,488
[45] Nov. 13, 1973

[54] DEVICE FOR TEMPORARY CUTOFF OF ELECTRIC LOADS IN PROGRAM SWITCH MECHANISMS

[75] Inventors: Walter Holzer; Bernd Mehlan, both of Meersburg, Germany

[73] Assignee: W. Holzer & Co. KG, Meersburg, Germany

[22] Filed: July 31, 1972

[21] Appl. No.: 276,382

[30] Foreign Application Priority Data
July 31, 1971 Germany.................. P 21 38 365.3

[52] U.S. Cl............ 200/38 R, 74/665 A, 192/48.91
[51] Int. Cl. ............................................. H01h 43/10
[58] Field of Search.................... 192/48.91; 74/661, 74/665 A, 665 B; 200/35 R, 37 R, 37 A, 38 R; 318/466

[56] References Cited
UNITED STATES PATENTS

| | | | |
|---|---|---|---|
| 3,373,253 | 3/1968 | Davin............................... | 200/38 R |
| 3,313,895 | 4/1967 | Dotto............................... | 200/38 R |
| 3,176,811 | 4/1965 | Smith............................... | 192/48.91 |
| 3,151,502 | 10/1964 | Kron ................................ | 74/665 B |

Primary Examiner—Robert K. Schaefer
Assistant Examiner—Gerald P. Tolin
Attorney—Watson et al.

[57] ABSTRACT

An apparatus de-energizes electric loads which are controlled by a program switch mechanism by de-coupling a program switch plate and a reversing switch plate which are driven from a motor drive source. The de-coupling mechanism comprises a claw coupling member having two guide tracks mounted between the reversing and program switch plates and two claw rings. Movement of the program switch plate by more than one succeeding program step causes axial movement of a claw ring moving on one of the guide tracks. An overrun coupling causes the program switch plate to be rotated at a faster rate by engagement with another motor drive source. Separation of the two claw rings causes the program switch plate to be driven at the faster rate and also causes axial movement of a shaft on which are mounted the program switch plate, the reversing switch plate, the claw coupling mechanism, and the overrun coupling mechanism so as to changeover a block contact to de-energize selected loads.

6 Claims, 5 Drawing Figures

DEVICE FOR TEMPORARY CUTOFF OF ELECTRIC LOADS IN PROGRAM SWITCH MECHANISMS

The invention relates to a device in program switch mechanisms having a program switch and a short program switch, for temporary cutoff of electric loads, preferably in washing machines, during the movement of the program switch by more than one immediately succeeding step which operates as a function of the operating states of a program switch and a short program switch.

German Patent No. 1,710,769 describes a program switch mechanism for automatic washing machines, wherein there is a drive motor which has a slidable rotor movable to various end positions according to the energization of the motor, and one of two drives is respectively coupled with rotor shaft. In this arrangement the leaf spring which holds the rotor in its outer position is part of an auxiliary switch for an operating circuit of the washing machine. The auxiliary switch can serve to cutoff different loads during fast over-running of two or more successive program steps, for example of a washing or dishwashing machine, during fast running or during a hand setting of the program switch mechanism. This is important because otherwise in going through a larger program section the load will be briefly connected, although this is not desirable at this particular point. Aside from the fact that there are disadvantages for the running, washing or rinsing program from unintentional brief switching-on of loads — for example, through brief actuation of the rinsing device which injects a washing agent at the wrong time — the brief switching-on causes disturbing pulses in the conducting network in the machine which will have to be eliminated by some kind of cutout means.

The progressive development in washing and dishwashing machine control devices indicates that the production of a drive motor for the program control device with an axially displaceable rotor according to German Patent No. 1,710,769 is too expensive. In the meantime small synchronous motors have been simplified in such a way that it is more economical to provide separate motors for "normal" and "fast" running of a program control device. However, in a program switching mechanism with a two motor drive, the teaching of German Patent No. 1,710,769 cannot be used.

It is the primary object of the present invention to develop a device of the tupe specified for a program switching mechanism with two drive motors which are suitable in a simple way to actuate a switch ("blocking contact") so as to separate individual units from the power supply, if the program switching mechanism overruns because of a fast program section or if this occurs because of hand setting of the program switch mechanism.

It is a feature of the invention that the blocking contact is to be switched on again at the end of the process within a specified time. This problem is solved by placing a claw coupling provided with guide tracks between the program switching plate and the reversing switch plate. The claw coupling has two claw rings, one of which executes an axial movement according to its guide track with movement of the program switch plate by more than one immediately successive step. Additionally, between the claw coupling and the program switch plate there is an overrun coupling, which opens in both end positions of the claw coupling and is briefly closed upon relative rotational shifting of the two claw rings.

The invention has various advantages as compared to known devices. It works reliably even with a rotational shift of the program switch plate, which corresponds to a second step following immediately after a first step. Also, with manual setting of the program switch plate, the device works absolutely reliably. The overrun coupling between the program switch and the short program switch has reliable wearing characteristics. Moreover, there is no annoying noise from the overrun coupling. Because of the essentially coaxial disposition of the whole device, it is especially compact.

The following description of an exemplary embodiment of the invention is taken with reference to the drawings wherein.

Figure 1:
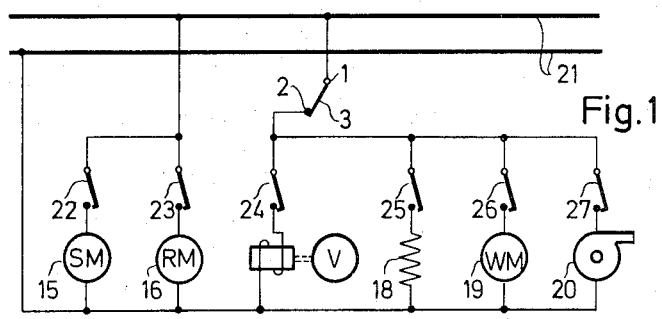
FIG. 1 is a circuit diagram showing the function of a "blocking contact;"

An electric device, for example a washing or dishwashing machine, is supplied from an electric network 21 (FIG. 1) with electric energy. Different electric loads, for example a fast running motor 16, an electromagnetic valve 17, a heating coil 18, a washing motor 19 and a pump 20, are switched on and off again by a program operated set of switch program contacts 23, 24, 25, 26 and 27. In the example, program contacts 24, 25, 26 and 27 receive current via a supplementary contact 1, 2, 3 (a so-called blocking contact) which is normally closed but which can be opened in specific operational states. This occurs for example in shifting of the program switch during so-called "fast operation," that is, when immediately successive program positions are overrun. Further, blocking contact 1, 2, 3 is opened if the program switch is set manually over more than one program step.

The motor movement of the program switch in fast operation can occur for example by means of a program dependent contact 23 (FIG. 1), which delivers current to a fast running motor 16. A motor 15 is connected to the network 21 via a network contact 22 and assures the normal program course of a program switch mechanism.

Figure 2:
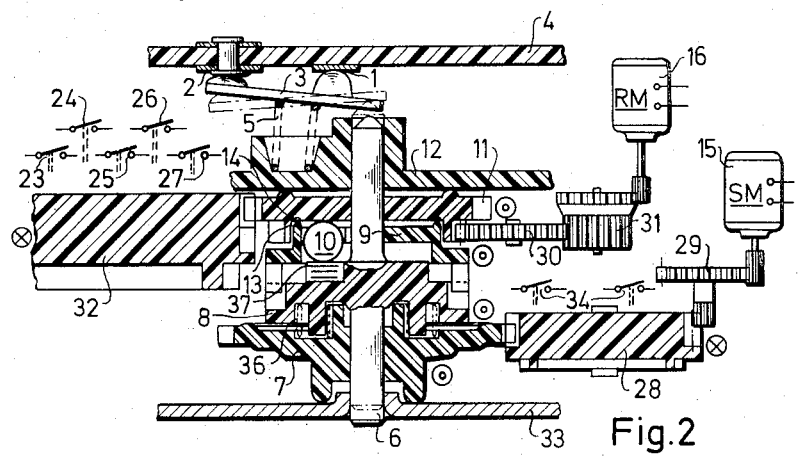
FIG. 2 illustrates a sectional view of an embodiment of the invention.

The arrangement of the device is described with reference to a program switching mechanism with two motors. In the embodiment of FIG. 2, program switch plate 32 for time dependent switching of the total program and reversing switch plate 28 for constant reversing of the direction of rotation of a washing motor are shown. It is apparent that other mechanisms such as rolls can also be used.

Reversing switch plate 28 is intended always to actuate reversing contact 34 during the washing program in a washing machine. Therefore, the reversing switch plate 28 — for example via one or more drive gears 29 — is driven by motor 15 in the direction of rotation that is indicated in FIG. 2. A coupling wheel 7 is in engagement with the reversing switch plate 28 and also runs in the direction of rotation shown in FIG. 2.

The program switch plate 32 is actuated stepwise by a kinematic device, which is not shown, which is directly driven by reversing switch plate 28 and by motor 15. In addition, program switch plate 32 can be turned into a fast running position via coupling wheel 11, for example, by means of one or more drive wheels 30 and a coupling 31 of the fast running motor 16 (FIG. 2), which is not described in more detail as that mechanism is well known to those skilled in the art. The two coupling wheels 7 and 11 run freely on an axially displaceable shaft 6 in a frame 33 and a housing 12.

Figure 3A:
FIG. 3a shows a sectional view of a guide curve for a rolling body in an overrun coupling.

On shaft 6 there is provided a claw coupling that consists of two claw rings 8 and 9, of which one claw ring 8 is rigidly connected with shaft 6 and fixed in rotation with coupling wheel 7 so that axial movements between coupling wheel 7 and claw ring 8 are possible. The other claw ring 9 is rotatably borne on shaft 6 and additionally constitutes a cage for one or more rolling bodies, advantageously balls 10, which in specific operating states can bear on coupling wheel 11 and on guide track 37 of claw ring 8 (see also FIG. 3a). By means of a compression spring 36, which is supported on coupling wheel 7, the two claw rings 8 and 9 as well as coupling wheel 11 are pressed against housing 12. The guide track 38 on claw ring 8 (FIG. 3b) is sensed by projection 9' (or a claw) on claw ring 9. Guide track 38 makes it possible with specific relative movements of the two claw rings 8 and 9 to effect an axial movement of the claw rings.

Figure 3B:
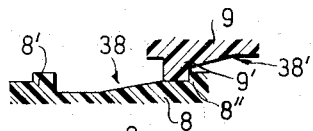
FIG. 3b shows a guide track and associated claw ring of the claw coupling.

In the mutual operating position of the two claw rings 8 and 9 shown in FIG. 3b, shaft 6 is in the position illustrated in FIG. 2 and thereby it is possible for contact bridge 3 of blocking contacts 1, 2, 3 (FIGS. 2, 1) to effect a transfer of current between the two contact points 1 and 2. For this purpose, contact bridge 3 is brought into the position shown in FIG. 2 by means of compression spring 5 and is held in that position. Loads 17, 18, 19 and 20 (FIG. 1) can thus be supplied in this operating position of blocking contact 1, 2, 3, in so far as the corresponding program contacts 24, 25, 26 and 27 are closed.

In the following discussion for the sake of simplicity only one ball 10 will be described. It has already been noted that other rolling bodies can be used. In a practical embodiment a plurality of rolling bodies, advantageously balls 10, would be provided.

Figure 3C:
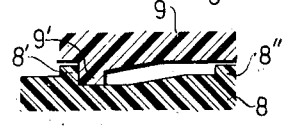
FIG. 3c shows the guide track of the claw coupling as shown in FIG. 3b but with the coupling parts not spread.

If the program switch plate 32 of the fast running motor 16 is turned by more than one program step, guide track 37, on which ball 10 bears, allows engagement of nose 13 on claw ring 9 with recesses 14 on coupling wheel 11. After the engagement between claw ring 9 and coupling wheel 11, claw ring 9 will be turned more rapidly than it would corresponding to the driving speed from reversing switch plate 28. Projection 9' of claw ring 9 then passes through guide track 38 of claw ring 8 and finally strikes projection 8' of claw ring 8 (FIG. 3c). In the meantime ball 10 is lifted again by guide track 37 on claw ring 8, which leads to a removal of the engagement between claw ring 9 and coupling ring 11. If claw rings 8 and 9 shift from the position shown in FIG. 3b to the position shown in FIG. 3c, there is an axial movement of shaft 6 by means of claw ring 8 which is in rigid connection with shaft 6 such that blocking contact 1, 2, 3 is opened. As soon as program switch plate 32 again comes to rest, the two claw rings 8 and 9, because of the constant movement of rotation of reversing switch plate 28, again come together in the position shown in FIG. 3b. Thereby, the position of shaft 6 as shown in FIG. 2 is re-established and blocking contact 1, 2, 3 is again closed. The opening of blocking contact 1, 2, 3 occurs in the same way with the hand-setting of program switch plate 32.

Short program steps are not sufficient to move projection 9' of claw ring 9 (FIG. 3b) so far out of guide track 38 from claw ring 8 so as to open blocking contact 1, 2, 3. The opening of this blocking contact is further prevented in that in the position of shaft 6, which is shown in FIG. 2, there is a certain amount of play between shaft 6 and contact bridge 3 which is supplementarily so designed that upon occurrence of a specific contact burn out, a contact is provided. Coupling 31, the structure and operation of which are well known, ensures that with the step-wise movement of program switch plate 32 and with the manual setting thereof, fast running motor 16 will not be affected. Because shaft 6 rotates constantly, it will be readily axially actuated as described above.

Since overrun coupling 10, 13, 14 is brought entirely out of engagement, the fast running motor will not be loaded by this coupling in a "fast running" mode, which would be the case for example if a ratchet mechanism were used.

What is claimed is:

1. In a program switching mechanism operable at a given speed and at least one higher speed, apparatus for temporarily de-energizing electric loads during operation of said program switching mechanism at said at least one higher speed, comprising:

program means for controlling the time dependent switching of said program switching mechanism;

switching means for de-energizing said electric loads;

means for driving said program means at said given speed, including first coupling means connected to said switching means;

means for driving said program means at said at least one higher speed, including a second coupling means engaging said program means; and said first and second coupling means engaging with one another for periodically displacing said first coupling means to actuate said switching means, thereby de-energizing said electric loads.

2. Apparatus as in claim 1 further comprising means for disengaging sad first and second coupling means only during operation of said switching mechanism at said at least one higher speed.

3. Apparatus as in claim 1 wherein said first coupling means includes a cam member mounted thereto and said second coupling means includes cam follower means engaging said first cam means.

4. Apparatus as in claim 3 wherein said first coupling means includes an axially movable rotatable shaft, a first coupling wheel mounted to said shaft, and further including means for mounting said cam member to said first coupling wheel enabling resilient displacement between said cam member and said first coupling wheel;

said second coupling means includes a second coupling wheel rotatably mounted to said shaft, and further including means for releasably engaging said cam follower with said second coupling wheel; and said switching means includes a pivotally mounted contact engaging said shaft.

5. Apparatus as in claim 4 wherein said means for releasably engaging disengages said first and second coupling means only during operation of said switching mechanism at said at least one higher speed;

said cam follower includes a guide track;

said means for engaging including means movable in said guide track and retained by said second coupling wheel, whereby said second coupling wheel is disengaged from said cam follower.

6. Apparatus as in claim 5 wherein said means movable in said guide track is a ball bearing.

* * * * *